US005763056A

United States Patent [19]
Lund et al.

[11] Patent Number: 5,763,056
[45] Date of Patent: Jun. 9, 1998

[54] LIGHT BLOCKING TRANSPARENCY ASSEMBLY

[75] Inventors: Virtudes Ramirez Lund, Round Rock; James Beard Svacha, Austin, both of Tex.

[73] Assignee: Minnesota Mining and Manufacturing Company, Saint Paul, Minn.

[21] Appl. No.: 792,272

[22] Filed: Jan. 31, 1997

[51] Int. Cl.⁶ ........................................ B32B 3/00
[52] U.S. Cl. ............... 428/195; 428/42.2; 428/44; 428/121; 428/192; 428/203; 428/332; 428/411.1; 428/913; 353/120
[58] Field of Search .................. 353/120; 428/195, 428/204, 411.1, 913, 914, 42.2, 44, 121, 192, 203, 332

[56] References Cited

U.S. PATENT DOCUMENTS

| | | | |
|---|---|---|---|
| 4,379,804 | 4/1983 | Eisele et al. | 428/332 |
| 4,402,585 | 9/1983 | Gardlund | 353/120 |
| 5,237,355 | 8/1993 | Kiehne et al. | 353/120 |
| 5,298,309 | 3/1994 | Carls et al. | 428/195 |
| 5,306,686 | 4/1994 | Patel et al. | 503/200 |
| 5,310,591 | 5/1994 | Dodge et al. | 428/195 |
| 5,319,400 | 6/1994 | Herbert et al. | 353/120 |
| 5,329,324 | 7/1994 | Candido | 353/120 |

*Primary Examiner*—William Krynski
*Attorney, Agent, or Firm*—Matthew B. McNutt

[57] ABSTRACT

A light blocking transparency assembly comprises a single sheet of transparency film and two foldable opaque flaps. The flaps overlap when in their folded position. The inventive construction provides improved feedability of the assembly through a variety of imaging devices.

17 Claims, 5 Drawing Sheets

LIGHT BLOCKING TRANSPARENCY ASSEMBLY

FIELD OF THE INVENTION

The present invention relates to films and film constructions having an image thereon (transparencies) for use with overhead projectors. In particular, the invention relates to such films and film assemblies which are particularly suitable for imaging in copiers and other imaging devices.

BACKGROUND OF THE INVENTION

Transparencies are transparent or translucent films which may be clear or colored and include textual or graphical data. The data on the transparency may be projected on a distant surface or screen, usually in enlarged form, by an overhead projector so that the data may be observed by a large number of people at once. A typical overhead projector includes a stage upon which the transparency may be placed. A light from a source within the projector is directed through the stage and the transparency to a lens system which focuses the light, and an image of the data contained on the transparency, on the distant viewing surface.

Films for use with overhead projectors have been developed and improved continuously over the years. Early transparencies were merely clear film on which an image could be drawn with, for example, a suitable pen. Later improvements included ink receptive layers that were coated on the films to improve certain characteristics of the film, such as drying, image spreading, and smudging. For example, U.S. Pat. No. 4,379,804 to Eisele et al. describes a two-layer film construction which provides an ink-receptive layer on the film. Such a construction can be used in ink jet printers of the type exemplified by the Hewlett Packard Company's DeskJet 660C.

Of course, other film constructions and imaging methods may also be used to generate transparencies. For example, U.S. Pat. No. 5,310,591 to Dodge et al. describes an image receptive sheet suitable for use in a plain paper copier; U.S. Pat. No. 5,306,686 to Patel et al. describes a thermally imageable sheet; and U.S. Pat. No. 5,298,309 to Carls et al. describes a sheet suitable for use in a color copier, such as the Canon CLC 500.

In addition to film constructions intended to improve the use of transparency films with particular types of imaging devices, other inventive constructions have been developed to make the use of overhead transparencies easier. For example, U.S. Pat. No. 4,402,585 to Gardlund discloses a transparent film envelope having foldable flaps attached to its edges, and having perforated holes down one edge. A previously imaged transparency can be inserted in the envelope for protection, and with the flaps in the folded position the perforations can be used to store the assembly, for example, in a three ring binder. In the unfolded position, the flaps block unwanted light from passing the edges of the transparency and reaching the screen. Additionally, the flaps may also be used for the user's presentation notes. In some embodiments, the flaps extend substantially over all the area of the transparency, thus conferring the additional benefit of enabling the transparency to be easily viewed when in storage. Other inventions have improved on features of U.S. Pat. No. 4,402,585. For example U.S. Pat. No. 5,237,355 to Kiehne et al. describes an envelope with increased flexibility.

Transparency films having attachments directly on the imageable film are also known. For example, Minnesota Mining and Manufacturing Company's product PP2410 is a film intended for use in a Xerographic-type copier that has a sheet of paper of essentially the same size as the carrier film adhesively bonded to the film along one edge. The adhesive is of the repositionable or removable type, thus allowing the paper sheet to be removed easily for viewing the imaged film while leaving little or no adhesive residue on the film. However, there is no provision in the adhesive bonding to allow flexibility between the carrier sheet and the paper sheet, and in fact such flexibility might be detrimental to the proper functioning of the assembly.

Other attachments to imageable films include a narrow stripe of paper or other functionally opaque material which is adhered to the carrier film with a repositionable or removable adhesive. The stripe is intended to indicate to the optical sensor mechanism of a copying machine that a copy cycle is to be initiated, because it is known that clear carrier film will not function in certain copying machines due to the inability of the machine to detect the presence of the transparent film. A striped carrier film of this type is supplied by 3M as PP 2200 copier film.

A recent invention described in U.S. Pat. No. 5,319,400 to Herbert et al. has made a large improvement in imageable film assemblies for use with overhead projectors. Herbert et al. describes an imageable film assembly suitable for use in an ink jet printer or a copier, having perforations along one edge of the film (for storage in a binder, for example), and flexible light blocking flaps attached directly to the imageable film. The Herbert et al. assembly confers the combined advantages of reduced weight and improved storability (resulting from the elimination of a protective storage envelope), extraneous light blocking and the ability to append notes on the attached flaps, and the ability to pass the entire assembly through an imaging device such as a copier or printer.

While Herbert et al. represents a large step forward in the art, additional improvements are desired. Recently, particular attention has been paid to improving the feedability of the imageable film assemblies. Feedability of an assembly relates to the ability of the assembly to pass through an imaging device without mis-feeding or jamming in the imaging devices, and is considered a very important product property by the user.

It is known that in certain devices, particularly high speed copiers and certain ink jet printers, that feed failures and jamming occur with film assemblies like those of Herbert et al. For example, if an imaging assembly of this type is directed around a curve in the feed path of a high speed copier there is a strong possibility that the free edge of the flap on the trailing edge of the assembly may separate from the imageable film and catch on a protruding part of the copier, thereby causing a feed failure. Similarly certain ink jet printers have internal grids intended to guide and protect the imageable media used in the printer. It has been found that free corners of the light blocking flaps can catch on these internal grids and result in a feed failure and damage to the imageable assembly. Because mis-feeds and jams result in wasted products, lost time, and end user dissatisfaction, it is desirable to avoid these problems.

As the use of overhead projectors and transparency assemblies increases, it is also desirable to have only a small range of imageable film assembly product types which work with a wide variety of imaging devices, as this reduces manufacturing complexity, improves the economics of product manufacture, and lessens the risk of the user mismatching the product and imaging device. There thus exists a need for an improved imageable film assembly which has improved feedability and which is suitable for use in a wide variety of imaging devices, while at the same time maintaining the advantages of prior film assemblies, such as disclosed in Herbert et al.

SUMMARY OF THE INVENTION

The present invention describes an imageable film assembly which exhibits improved feedability over the constructions of U.S. Pat. No. 5,319,400. In the preferred embodiment of this invention a first opaque flap is caused to overlap a second opaque flap in such a manner that the edge of the overlying flap is substantially removed from the central region of the construction. This has been found to enable superior feeding properties to be obtained in both copiers and ink jet printers.

It should be noted that the Figures exhibit some exaggeration of material dimensions to more readily illustrate the relationships between the various components.

DETAILED DESCRIPTION OF THE INVENTION

Figure 1:
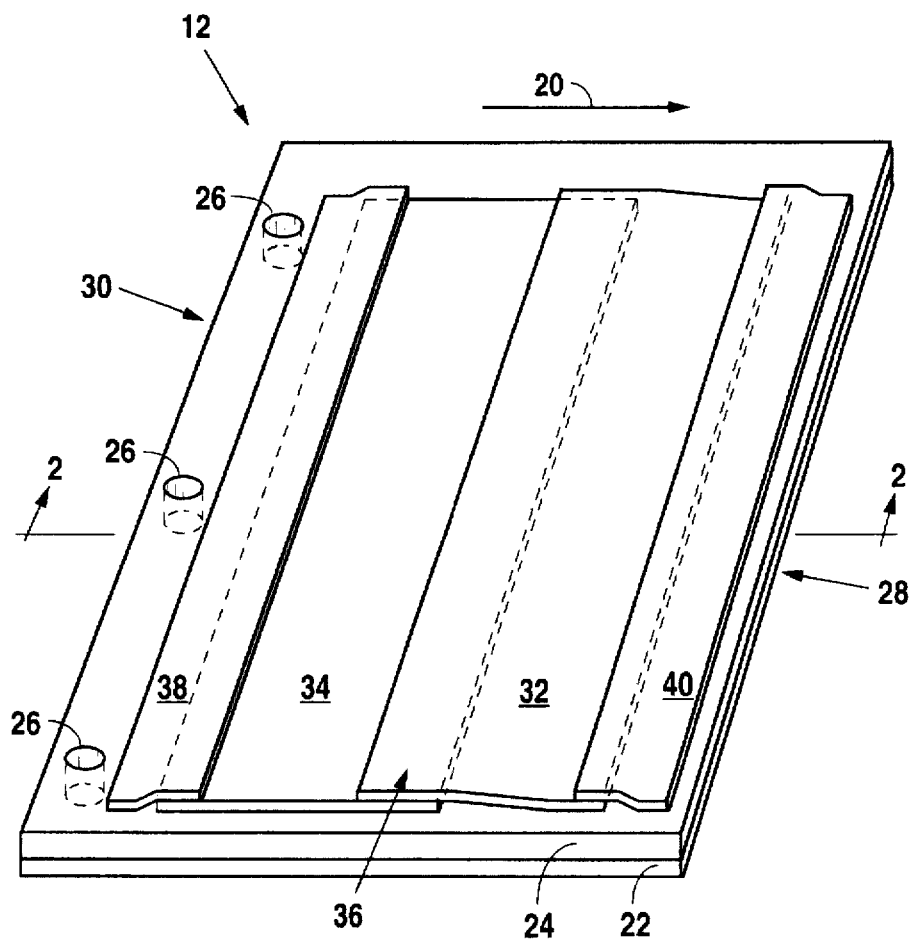
FIG. 1 is a perspective view of the present invention.

FIG. 1 illustrates a preferred embodiment of the inventive imageable film assembly 12. Arrow 20 shows the direction of motion of the assembly 12 through an imaging device (not shown) such as a photocopier. Assembly 12 includes a carrier film 24. Carrier film 24 is transparent to at least one region of the visible light spectrum, and possesses sufficient strength to pass through an imaging device. Biaxially oriented Poly(ethyleneterephthalate) films having a thickness in the range of 75 to 150 microns have been used commercially for the intended purpose and have been found to have acceptable properties.

Associated with the carrier film 24 is an imageable surface 22, shown in FIG. 1 as a distinct layer. A distinct layer, while able to confer additional valuable properties to the image quality of assembly 12, is not essential. For example an uncoated surface of carrier film 24, may function satisfactorily in certain applications, such as in a copier, when toner adhesion is not critical to the image quality.

In FIG. 1, assembly 12 is illustrated as having perforations 26 along one edge of carrier film 24. Perforations 26 are suitable for inserting the assembly 12 in commercially available protective covers such as three-ring binders. Perforations 26 could be on any edge of film 24, or could be omitted from the assembly 12 altogether. If assembly 12 is supplied without perforations 26, such perforations may be made after imaging, if desired, by the user.

As shown in FIG. 1, assembly 12 has a leading edge 28 that is the first edge to enter and exit the imaging device, and a trailing edge 30 that is the last edge to enter and exit the imaging device. Associated with edges 28 and 30 are a leading flap 32 and a trailing flap 34, respectively. Flaps 32 and 34 are made of a functionally opaque or light-absorbing material. A preferred material is paper, but the material could also be a light-absorbing film, a pigment-containing film, a translucent film or other material whose primary property is an ability to prevent unwanted light from reaching the viewing screen.

Depending upon the selected material, flaps 32 and 34 are normally in the range of 50 to 250 microns in thickness, and are attached to carrier film 24 by means of flexible tape hinges 38 and 40. These hinges may be made of paper, cellulose acetate tape, or preferably poly (ethyleneterephthalate) tape. Tape suitable for use in this purpose is disclosed in U.S. Pat. No. 5,237,355. The thickness of hinges 38 and 40 is preferably on the order of tens of microns, and the adhesive (not shown) used to bond the components together is preferably permanent in the sense that it is not intended for repeated removal and readhesion.

Figure 2:
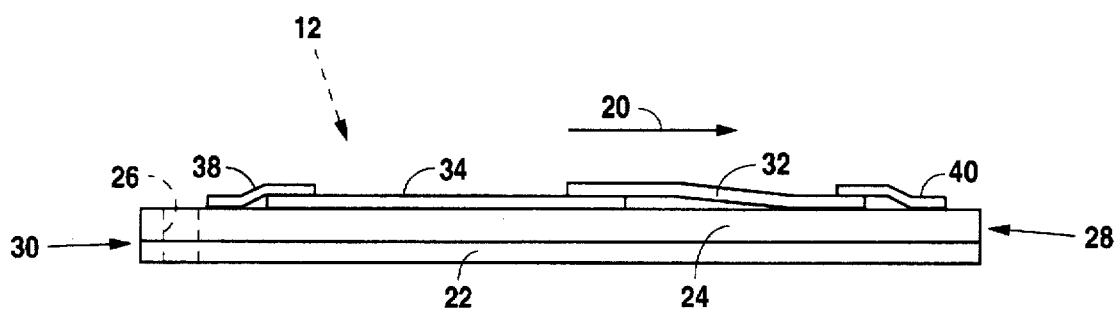
FIG. 2 is a cross-sectional view of the invention of FIG. 1 along lines 2—2 in FIG. 1.

The disposition of the flaps 32 and 34 with respect to the carrier film 24 is of particular importance to the functioning of the invention. It is essential that flaps 32 and 34 create an area of overlap 36, in which the trailing flap 34 is positioned between the leading flap 32 and the carrier film 24, as shown in FIGS. 1 and 2. As best seen in FIG. 2, trailing flap 34 is partially overlain by leading flap 32, thereby creating overlap portion 36.

Figure 3:
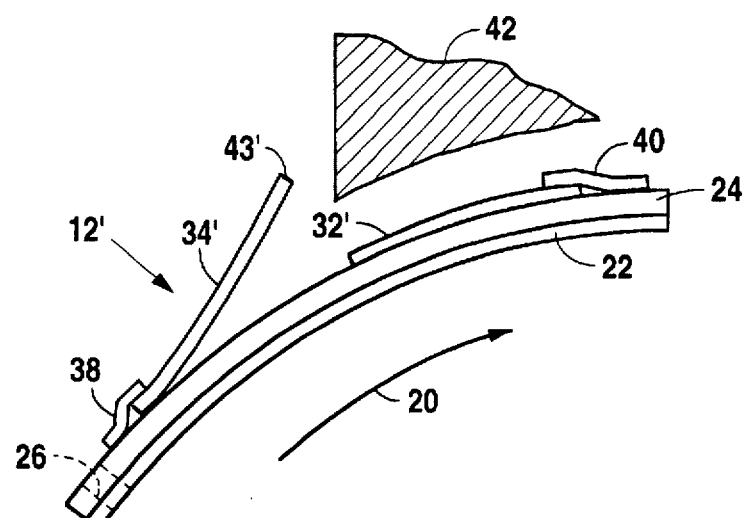
FIG. 3 illustrates a prior art imageable film assembly mis-feeding in an imaging device.

FIG. 3 illustrates the importance of overlap portion 36, and particularly the importance of leading flap 32 overlapping trailing flap 34. In FIG. 3, an assembly 12' typical of the prior art is traversing through a portion of a photocopying machine. The construction of assembly 12' is identical in all respects to the assembly 12 shown in FIGS. 1 and 2, except that flaps 32' and 34' do not overlap. The direction of motion is indicated by arrow 20, and the curve of the carrier film 24 is intended to indicate that the film is traversing a curved path through the copying machine. Only a generic internal component 42 of the copier is shown, to illustrate the most common cause of mis-feeding.

As illustrated in FIG. 3, the inherent rigidity of flap 34' has caused it to separate from the carrier film 24, to such an extent that copier component 42 will catch leading edge 43' of trailing flap 34' and will impede further progress of flap 34' through the copying machine. As a result of this impedance, one of several outcomes may result. Flap 34' may be forced to detach from the carrier film 24. Flap 34' may be folded back so that it trails the carrier film 24. Flap 34' may buckle and prevent any further movement of the assembly 12' through the copier. All of these possible outcomes are undesirable, as they all cause damage to the assembly 12, inconvenience the user, and potentially damage the copier.

Figure 4:
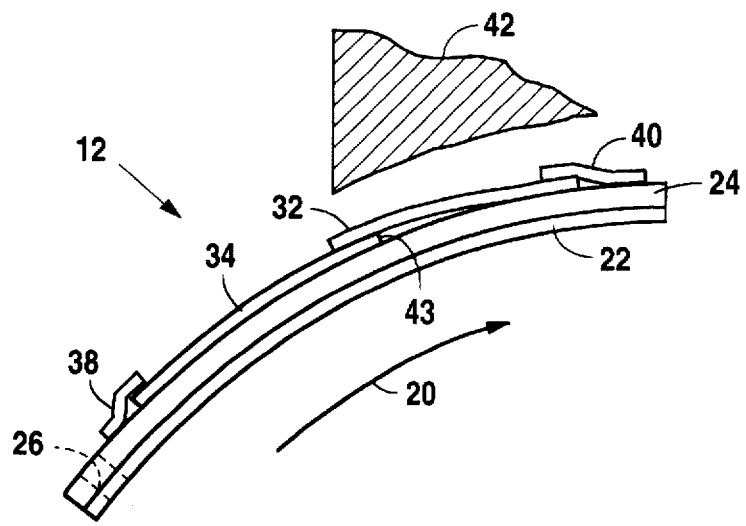
FIG. 4 illustrates the inventive imageable film assembly passing through an imaging device like that of FIG. 4.

FIG. 4 shows the inventive assembly 12 of FIGS. 1 and 2 traversing through a portion of a photocopier identical to that shown in FIG. 3. As illustrated by FIG. 4, if the trailing flap 34 is overlaid by leading flap 32, undesired separation of trailing flap 34 from carrier film 24 is prevented. Direction of motion is again shown by arrow 20. As can be seen from the Figure, leading flap 32 overlaps trailing flap 34 and has the effect of preventing copier feature 42 from catching on the leading edge 43 of trailing flap 34, thereby assisting in smooth and trouble free passage of assembly 12 through the copier.

Figure 5:
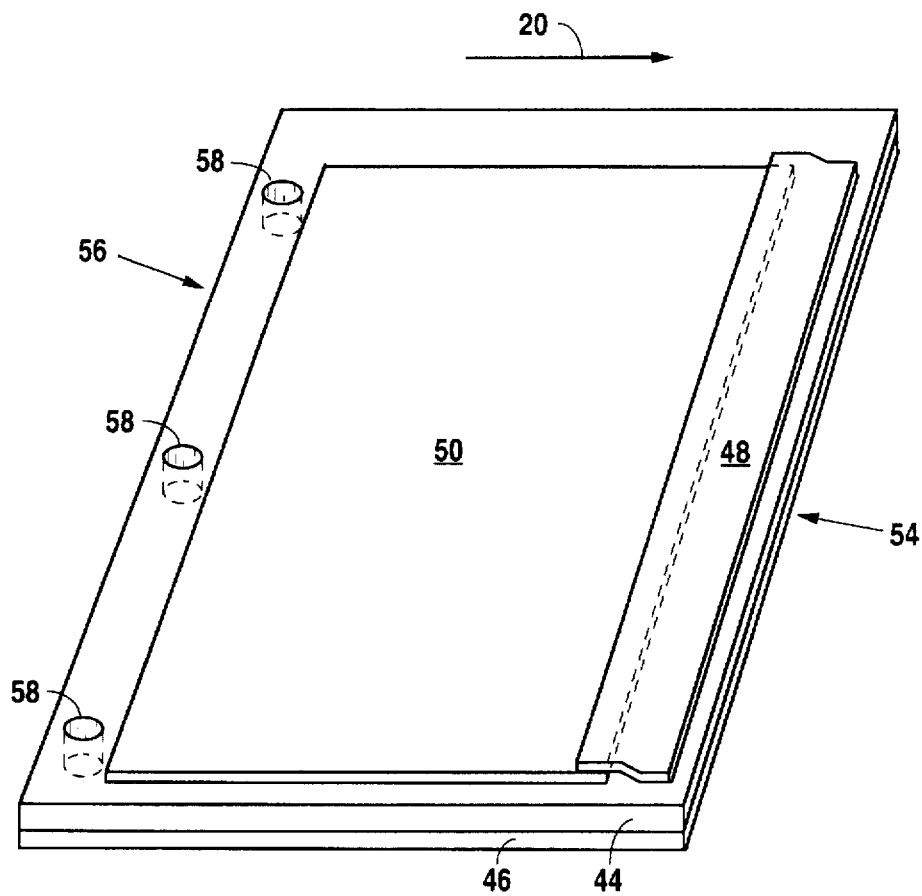
FIG. 5 is an alternative embodiment of the invention.

FIG. 5 shows an alternative embodiment of the inventive assembly having a single flap rather than two flaps, as shown in FIGS. 1–4. The assembly of FIG. 5 is made of materials like those used in the embodiment described in FIGS. 1–4 and comprises a carrier sheet 44 having an image receptive surface or coating 46. Flexibly attached to the carrier sheet 44 by a hinge 48 is a flap 50. Hinge 48 is adjacent leading edge 54 and is attached in a manner like that described above for hinges 38, 40 in FIGS. 1–4. That is, the adhesive used to bond the flap to the carrier web is not intended for repeated removal and readhesion as is the case with certain products, for example the previously mentioned Plain Paper Copier Film PP2410 supplied by 3M Company. Perforations 58, are shown adjacent trailing edge 56, but as described for perforations 26 in FIGS. 1–4, perforations 58 could be placed adjacent any desired edge, or could be omitted from the assembly entirely.

An essential difference between the embodiment of FIG. 5 and the embodiment described in FIGS. 1–4 is, of course, the absence of a second flap and therefore the absence of an overlap area. However, the embodiment of FIG. 5 confers the same advantages as the embodiment of FIGS. 1–4 when moved in the direction of arrow 20 through an imaging device such as a photocopier. By feeding the hinged end of flap 50 through the imaging device first, the free end of flap 50 will not catch on any protrusions within the imaging device.

Figure 6:
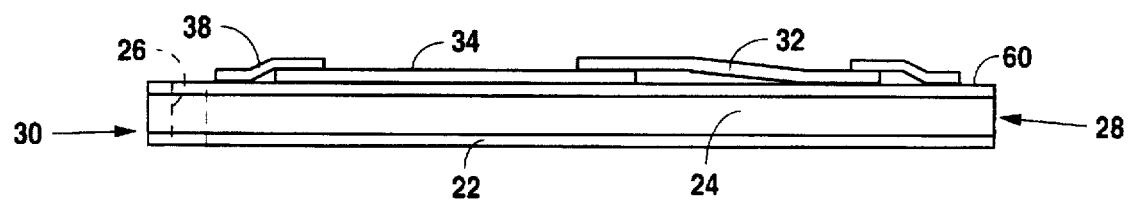
FIG. 6 is an alternative embodiment of the invention having a coating on the surface of the carrier film having properties designed to reduce or prevent movement of the flap relative to the carrier film.

FIG. 6 shows an alternative embodiment of the invention very similar to the embodiment of FIGS. 1–4. The components of the embodiment of FIG. 6 are similar to components described in the previous embodiments. The embodiment of FIG. 6 has an additional coating 60 added to the surface of the carrier film 24 adjacent to flaps 32, 34. Coating 60 is selected to provide a high coefficient of friction between carrier film 24 and flaps 32 and 34 and prevent movement of flaps 32, 34 relative to carrier film 24. Preferably, coating 60 provides a coefficient of friction of at least 0.3 with flaps 32 and 34. If desired, coating 60 may comprise the same material as imaging coating 22. Using the same material to coat each side of carrier film 24 may be desired to prevent curling of the carrier film during imaging.

Figure 7:
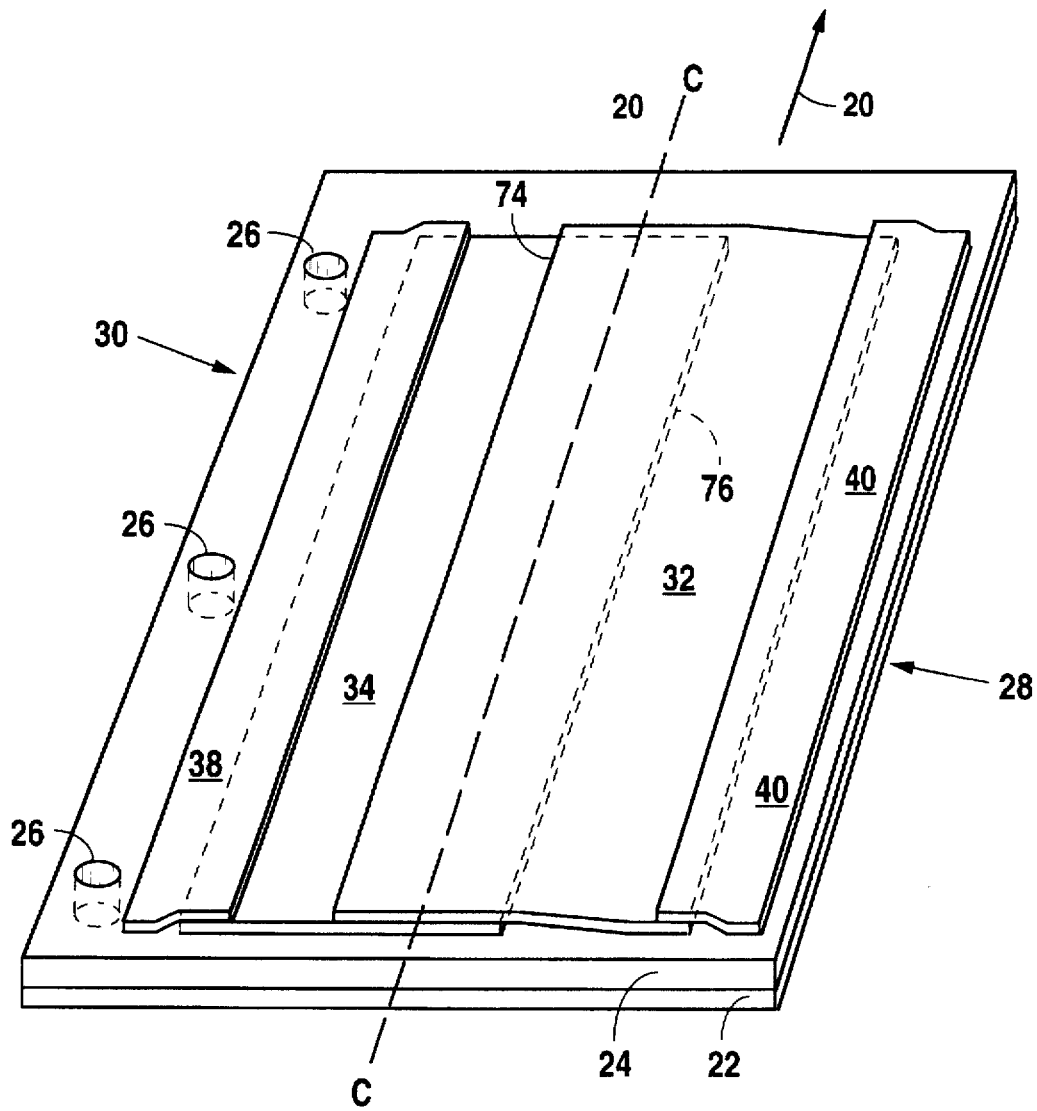
FIG. 7 is an embodiment of the invention suitable for use in an ink jet printer.

FIG. 7 shows an embodiment of the invention found particularly suitable for use in ink jet printers. A carrier sheet 24 has on one side an image receptive coating or surface 22, and on the other side, flaps 32 and 34 flexibly attached to the carrier sheet by tape hinges 38 and 40. The direction of motion through the imaging device is indicated by arrow 20, although it is expected that this same construction would feed satisfactorily in the opposite direction. A center line C—C is shown, being equidistant from edges 28 and 30. Flap 32 is shown substantially overlapping flap 34, so that free edge 74 of flap 32 is substantially nearer to carrier sheet edge 30 than it is to edge 28. In this embodiment the flap 34 is shown also extending substantially past the center line C—C towards the assembly edge 28. This is not a necessary condition, it only being necessary that edge 74 of flap 34 be substantially closer to edge 30 than to edge 28. It is possible for edge 76 of the underlying flap 34 to be closer to carrier sheet edge 30 than to carrier sheet edge 28, provided that it is still substantially overlapped by flap 32. It is also possible in this embodiment, designed for working in certain ink jet printers, for the overlap to be in the reverse direction. That is, flap 34 may overlap flap 32, the major requirement being that the exposed edge, now edge 76, be substantially removed from the region of the center line C—C.

It will be noted that the construction of the assembly of FIG. 7 is very much like that of the assembly of FIGS. 1–4, and in fact the construction of the two assemblies could be identical. In the assembly of FIGS. 1–4, it is important only that leading flap 32 overlaps trailing flap 34 such that free edge 43 of trailing flap 34 is covered and prevented from catching on any protrusions within the imaging device. The area of overlap 36 between flaps 32 and 34 can occur at any point, so long as this condition is satisfied.

Figure 8:
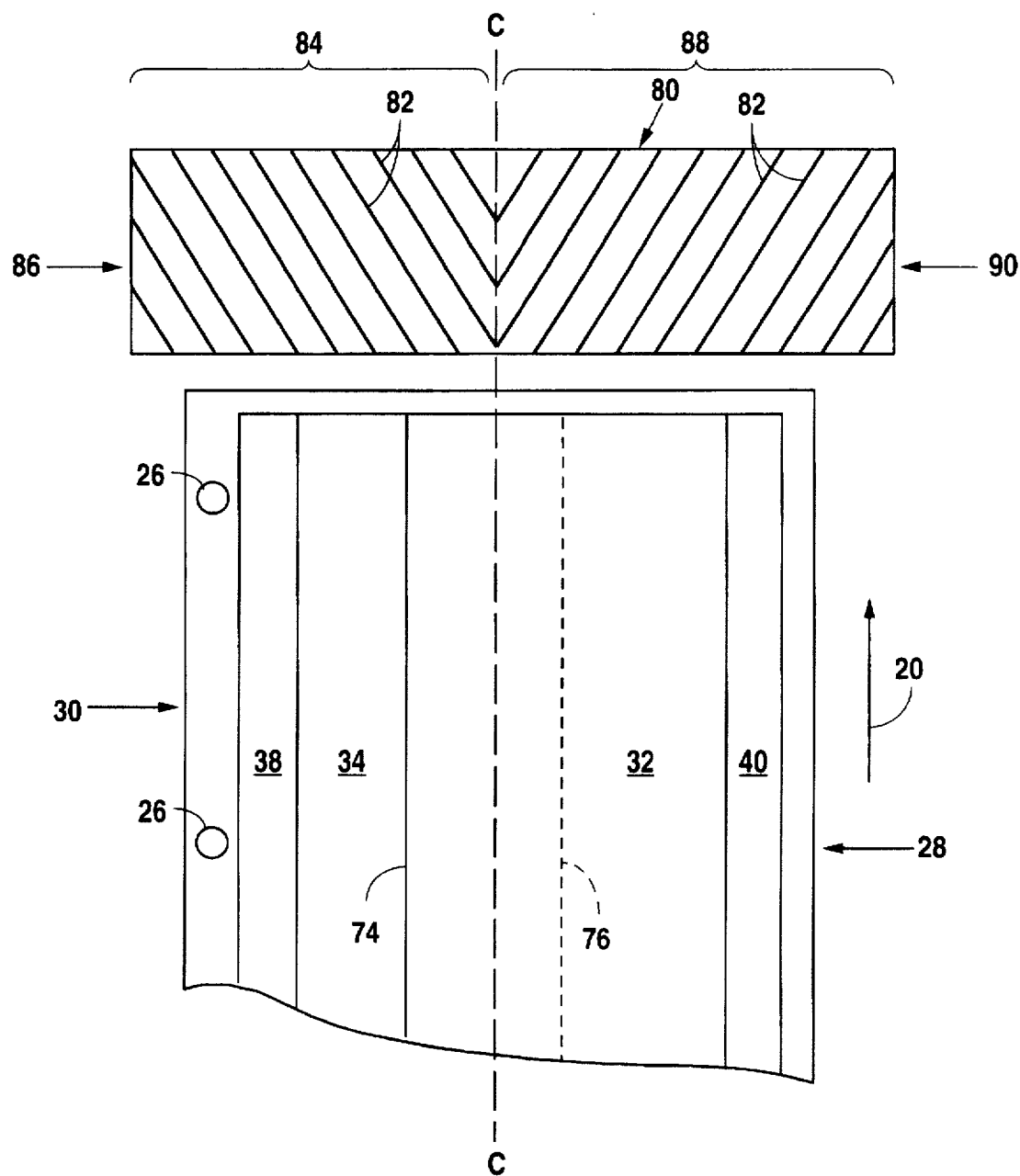
FIG. 8 illustrates the inventive assembly of FIG. 7 passing through an ink jet printer.

In contrast, in the assembly of FIG. 7, it is important that the free edge of the overlapping flap be removed from the central region C—C of the construction. This is important because it is common for ink jet printers to have internal guide grids which may otherwise catch on the free edge of the overlapping flap. A common guide grid 80 is illustrated in FIG. 8. Grid 80 has diagonal members 82 which are intended to smooth the imaging material as it moves through the printer. Diagonal members 82 in portion 84 of grid 80 work to pull the imaging material toward outer edge 86, while portion 88 of grid 80 works to pull the imaging material toward outer edge 90. In this manner, the imaging material is flattened and smoothed. In the embodiment of FIGS. 7 and 8, the free edge 74 of overlying flap 32 is urged by grid 80 away from its hinged edge, thereby smoothing the flap 32 and preventing a mis-feed of the imaging assembly. If free edge 74 were on the opposite side of center line C—C from that shown in FIG. 8 (or if flaps 32 and 34 were not overlapped), grid 80 could catch free edge 74 and force it back toward assembly edge 28, thereby causing flap 32 to fold back upon itself or buckle. In such an occurrence, the assembly is damaged and perhaps rendered useless.

It can clearly be seen that the inventive assemblies provide superior feedability when compared to prior art assemblies. The following examples illustrate the improvement:

EXAMPLE 1

Example 1 illustrates the use of the inventive assembly of FIG. 7 in ink jet printers. Two sets of samples were constructed. Both sets of samples used identical imaging film suitable for ink jet printers. The standard assembly had flaps 3⅞ inches wide, made of 60 lb. paper obtained from Consolidated Paper Co. The inventive assembly was made of similar materials except that the flaps were made to be 4⅛ inches wide. The inventive assembly thus had an overlap of the flaps of approximately ⅞ inch, whereas on the standard sample there was a gap of approximately ⅛ inch between the flaps. Ten sheets of the standard material were fed through five ink jet printers (three Hewlett-Packard 1200C printers, and two Hewlett-Packard 1600C printers). Of a total of 50 standard assemblies fed into the printers, 27 feeding defects were observed, mostly bending of the leading corners of the flaps. Four of the standard assemblies would not pass through the printers at all. When the inventive assemblies were subjected to the same test, in the same printers, no feeding defects were observed in 50 samples.

EXAMPLE 2

Two sets of samples were constructed in a manner like that in Example 1, except that an imaging film suitable for imaging in an electrophotographic copier was used as the carrier sheet. The dimensions of the final assemblies were the same as those of the assemblies of Example 1. Care was taken to ensure that the flap attached to the leading edge of the inventive assembly overlapped the flap attached to the trailing edge. Feeding the standard assemblies through three copiers (a Lanier 6360, a Xerox 5065, and a Xerox 1090) resulted in five out of five feed failures of the standard construction in each of the three copiers, or a 100% feed failure rate. When the inventive assemblies of were used, ten out of ten inventive assemblies successfully fed through the Lanier 6360 copier, and five out of five assemblies fed through the Xerox copiers, producing a 0% feed failure rate.

As clearly illustrated by the Examples, the inventive assemblies produce far superior feedability through both ink jet printers and photocopiers. The inventive assemblies permit a small range of assembly types to work with a variety of imaging devices, thereby improving the economics of product manufacture and lessening the risk of the user mismatching the product and the imaging device.

What is claimed is:

1. A light blocking transparency assembly for use with an overhead projector, the assembly comprising:
    a single substantially rectangular sheet of transparency film having first and second major surfaces and first and second longitudinal edges connected by shorter side edges;
    an imaging coating covering substantially all of at least one major surface of the transparency film and defining an imaging area, the imaging coating capable of accepting an image intended for projection by an overhead projector;
    a first opaque flap attached in a foldable manner adjacent the first longitudinal edge of the film, with the folded position being that position wherein the first flap extends from its attachment to the film toward the second longitudinal edge; and
    a second opaque flap attached in a foldable manner adjacent the second longitudinal edge of the film, with the folded position being that position wherein the second flap extends from its attachment to the film toward the first longitudinal edge;
    wherein the first and second flaps overlap when the flaps are in their folded positions.

2. The light blocking transparency assembly of claim 1, wherein said film is imageable by electrographic or xerographic means.

3. The light blocking transparency assembly of claim 1, wherein said film is imageable by ink jet printing.

4. The light blocking transparency assembly of claim 1, wherein the imaging coating covers the first major surface of the transparency film and wherein the first and second flaps are attached to the second major surface of the transparency film.

5. The light blocking transparency assembly of claim 1, wherein a free edge of the overlapping flap is substantially removed from a central portion of the assembly.

6. The light blocking transparency assembly of claim 1, wherein the second flap overlaps the first flap, and wherein a free edge of the second flap is positioned closer to the first longitudinal edge of the film than to the second longitudinal edge of the film.

7. The light blocking transparency assembly of claim 1, wherein at least one of the flaps has a width greater than one-half the width of the imageable film.

8. The light blocking transparency assembly of claim 1, wherein the coefficient of friction between the first flap and the second flap is at least 0.3.

9. The light blocking transparency assembly of claim 4, further comprising a coating on the second major surface having a coefficient of friction of at least 0.3.

10. An improved light blocking transparency assembly of the type having a single substantially rectangular sheet of transparency film having two major surfaces and longitudinal edges connected by shorter side edges, the film capable of accepting an image intended for projection by an overhead projector, and an opaque flap attached in a foldable manner adjacent each longitudinal edge of the film, with the folded position being that position wherein the flap extends from its attachment to the film toward the opposite longitudinal edge, the improvement comprising:
    an area of overlap between the flaps when the flaps are in their folded positions.

11. The light blocking transparency assembly of claim 10, wherein said film is imageable by electrographic or xerographic means.

12. The light blocking transparency assembly of claim 10, wherein said film is imageable by ink jet printing.

13. The light blocking transparency assembly of claim 10, wherein an imaging coating covers at least one of the major surfaces of the transparency film and wherein the flaps are attached to the major surface of the transparency film opposite the imaging coating.

14. The light blocking transparency assembly of claim 10, wherein edges of the area of overlap are substantially removed from a central portion of the assembly.

15. The light blocking transparency assembly of claim 10, wherein at least one of the flaps has a width greater than one-half the width of the imageable film.

16. The light blocking transparency assembly of claim 10, wherein the coefficient of friction between the flaps is at least 0.3.

17. The light blocking transparency assembly of claim 13, further comprising a coating having a coefficient of friction of at least 0.3 on the major surface adjacent the flaps.

* * * * *

UNITED STATES PATENT AND TRADEMARK OFFICE
CERTIFICATE OF CORRECTION

PATENT NO.: 5,763,056

DATED: June 9, 1998

INVENTOR(S): Virtudes R. Lund and James B. Svacha

It is certified that error appears in the above-identified patent and that said Letters Patent is hereby corrected as shown below:

On the title page, the name of the second inventor is listed as "James Beard Svacha" and the correct spelling for his name is --James Baird Svacha--.

Signed and Sealed this

Ninth Day of November, 1999

*Attest:*

Q. TODD DICKINSON

*Attesting Officer*   Acting Commissioner of Patents and Trademarks